INVENTOR
RUDOLF VETSCH
BY Yount, Raney, Flynn & Tarolli
ATTORNEYS

United States Patent Office 3,424,040
Patented Jan. 28, 1969

3,424,040
MACHINE TOOL
Rudolf August Vetsch, Walton Hills, Ohio, assignor to The Warner & Swasey Company, Cleveland, Ohio, a corporation of Ohio
Filed Sept. 22, 1966, Ser. No. 581,322
U.S. Cl. 82—21          23 Claims
Int. Cl. B23b 21/00, 39/20, 7/04

The present invention relates to a machine tool having a work supporting member and a tool supporting member, and more particularly relates to a machine tool having a spindle and an indexible tool carrying turret movable toward and away from the spindle.

Previously known machine tools of the type including a rotatable work supporting member and an indexible turret member, such as turret lathes, have been provided with a plurality of support portions on the turret which generally support tools which are successively indexible to a working position and are fed with the turret to engage the work. Such turret members are often of a generally polygonal shape with the tool supporting means on the faces or sides thereof. In many instances, where complex parts are being machined, the number of machining operations desired to be performed may exceed the number of normal tool positions available on the turret member. Certain prior art machine tools have been provided with tool support portions at the corners of the turret, or intermediate the normal tool support portions so that the turret lathe may be capable of performing additional machining operations. By performing additional machining operations by the use of one machine, the accuracy of dimensions of parts machined has been improved and handling of these parts minimized.

In certain types of machines, the normal tool support portions on the turret have a corresponding feed-stop operable to limit the travel of the turret toward the work supporting spindle member when the particular tool support portion is in its working position. The feed-stops are generally separately adjustable to provide for the desired amount of feeding travel of the turret member depending upon the particular tool support position which is in working position. The feed-stops are indexed upon indexing of the turret so that the proper feed-stop is in position to limit feed of the turret when the corresponding turret tool support portion is indexed to machining position. Oftentimes, such machine tools when utilizing auxiliary tools on the turret member, as noted above, are either ineffective to stop the feed of the turret when the auxiliary tool is in its working position, or stop the feed of the turret member before the auxiliary tool has finished its cut. For these reasons, the operator of the machine has had to make manual adjustments so that the time required to perform a given number of machining operations by the use of such auxiliary tools has been relatively long.

Accordingly, an object of the present invention is the provision of a new and improved machine tool including a turret member adapted to support an auxiliary tool or tools in addition to normal tools supported thereby and wherein the machine tool is simple in construction, yet effective to perform a multiplicity of machining operations, with a minimum amount of operator time and effort.

Another object of the present invention is the provision of a new and improved machine tool having a turret member operable to support normal work engaging tools and auxiliary tools for engagement with a workpiece, and in which a feed-stop means is automatically indexed when an auxiliary tool is in a working position to provide a stop for the feed thereof toward the workpiece.

A further object of the present invention is the provision of a new and improved machine tool including an indexible turret member which is movable toward and away from a cooperating work supporting member and including a plurality of normal tool support portions thereon sequentially indexible into a working position and a plurality of auxiliary tool support portions, and feed stop means associated with the turret to provide for a predetermined amount of feeding movement of a tool in its working position relative to the work supporting member and wherein the feed stop means includes members associated with individual ones of the normal tool support portions of the turret to control the amount of feeding movement of the turret member and in which means are provided for rendering a particular member of the feed stop means operable to limit feeding movement of an auxiliary tool support portion of the turret member relative to the workpiece.

Yet another object of the present invention is the provision of a new and improved machine tool including a work supporting member, an indexible turret member supported for feeding movement toward and away from the work supporting member and having a plurality of support portions thereon, stop means having a plurality of stops each corresponding to one of the support portions to limit feeding of its corresponding support portion toward the work support member, and wherein the stop means is indexed by first means operable in response to indexing of the turret to render one of the stops effective to limit feeding of the turret member when the turret member is indexed to a predetermined position and in which second means are provided for indexing the stop means in response to feeding movement of the turret member when the turret member is not in the predetermined position.

A still further object of the present invention is the provision of a new and improved turret lathe including a work support member, an indexible turret member supported for feeding movement toward and away from the work supporting member, stop means for limiting the feeding movement of the turret member wherein the stop means is indexed to provide a predetermined amount of feeding movement of the turret in response to indexing of the turret and in which means are provided for indexing the stop means in response to feeding movement of the turret.

Other objects and advantages of the present invention will become apparent from a consideration of the following detailed description thereof and from the accompanying drawings which form a part of the specification and in which.

The present invention provides an improved machine tool including a work supporting member and an indexible turret member adapted to support tools for movement toward and away from the work supporting member to effect a machining operation on work supported thereby. In particular, the present invention provides an improved turret lathe which includes an indexible tool carrying turret member movable toward and away from a rotatable spindle member which is adapted to rotatably support a workpiece. The turret is a generally polygonal member which includes tool support portions at its faces and which is adapted to support auxiliary tools at the corners of the turret member, or at positions intermediate the tool support portions. When the number of machining operations to be performed on the workpiece does not exceed the number of faces of the turret member it is usual practice to support the tools required at the faces of the turret. For this reason, tools supported at the faces of the turret member are referred to, hereinbelow, as normal work engaging tools. With the normal work engaging tools supported at the faces of the turret member, and auxiliary tools positioned intermediate the aforementioned tools, a turret lathe, embodying the present invention, is effective to perform a number of machining operations on a workpiece in excess of the number of faces of the turret and is adapted to perform such additional operations with a minimum amount of operator time and effort.

Figure 1:
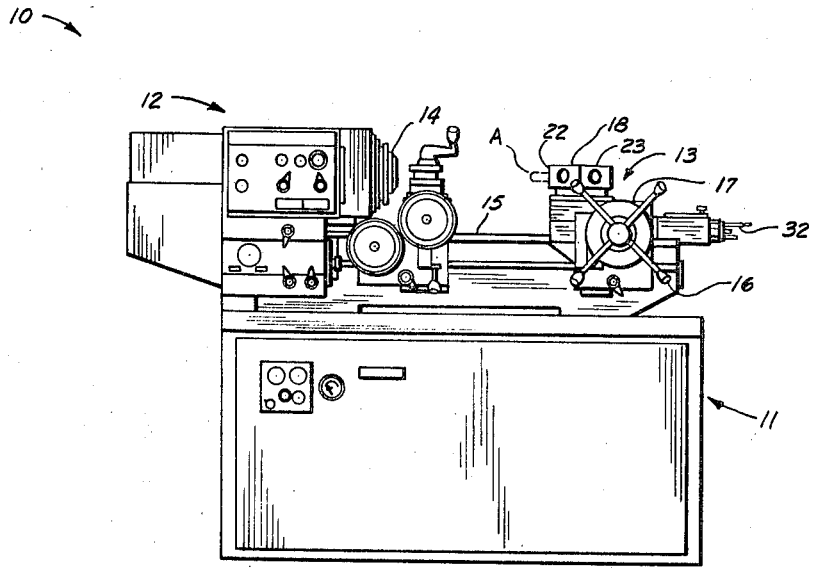
FIG. 1 is an elevational view of a machine tool embodying the present invention.

A turret lathe 10 is illustrated in FIG. 1 as representative of the present invention. The turret lathe 10 includes a bed or support member 11, a head stock 12 carried by the bed 11, and a carriage or saddle 13 movably supported on the bed. The head stock 12 includes a rotatable spindle member 14 which is adapted to rotatably support a workpiece, not shown, and is driven by suitable means such as an electric motor, also not shown. The saddle 13 is movable toward and away from the spindle member 14 along ways 15 provided on the support member 11 by a feed mechanism of the lead screw type which may be operated by a hand wheel 16 or a feed drive motor. The feed mechanism is of conventional construction and therefore is not illustrated in detail. The saddle 13 includes a frame member 17 carrying a turret member 18, which is supported on the frame for rotational indexing movement relative thereto. The saddle 13 also carries a stop means 19 for limiting the feeding movement of the saddle 13 toward the spindle member 14.

In the illustrated embodiment, the turret member 18 is a hexagonal member having sides or faces 22 and which is provided with conventional tool support portions 23 for supporting tools in a radially extending manner from the faces 22. Individual ones of the tools supported at the faces 22 of the turret member 18 are indexible into a working position upon rotational indexing of the turret member 18, and are moved into engagement with the workpiece to perform a machining operation thereon during movement of the saddle 13 along the ways 15 toward the spindle member 14. For purposes of explanation, tools A and B have been schematically illustrated in position on the faces 22A, 22B, respectively, of the turret member 18, and an auxiliary tool C is schematically illustrated in position at a corner 24 of the turret member. While only the tools A, B and C will be referred to hereinafter in the description of the operation of the turret lathe 10, it should be borne in mind that the lathe 10 may be operated with tools supported at all six faces 22 of the turret and with a number of auxiliary tools located at corners of the turret member as may be required by the part to be machined.

Figure 2:
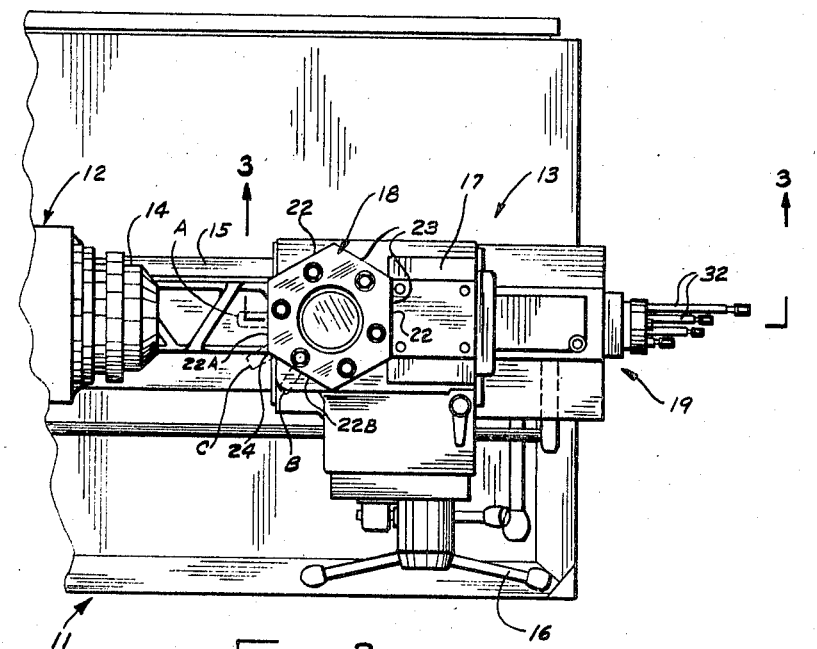
FIG. 2 is a plan view of a machine tool embodying the present invention.
Figure 3:
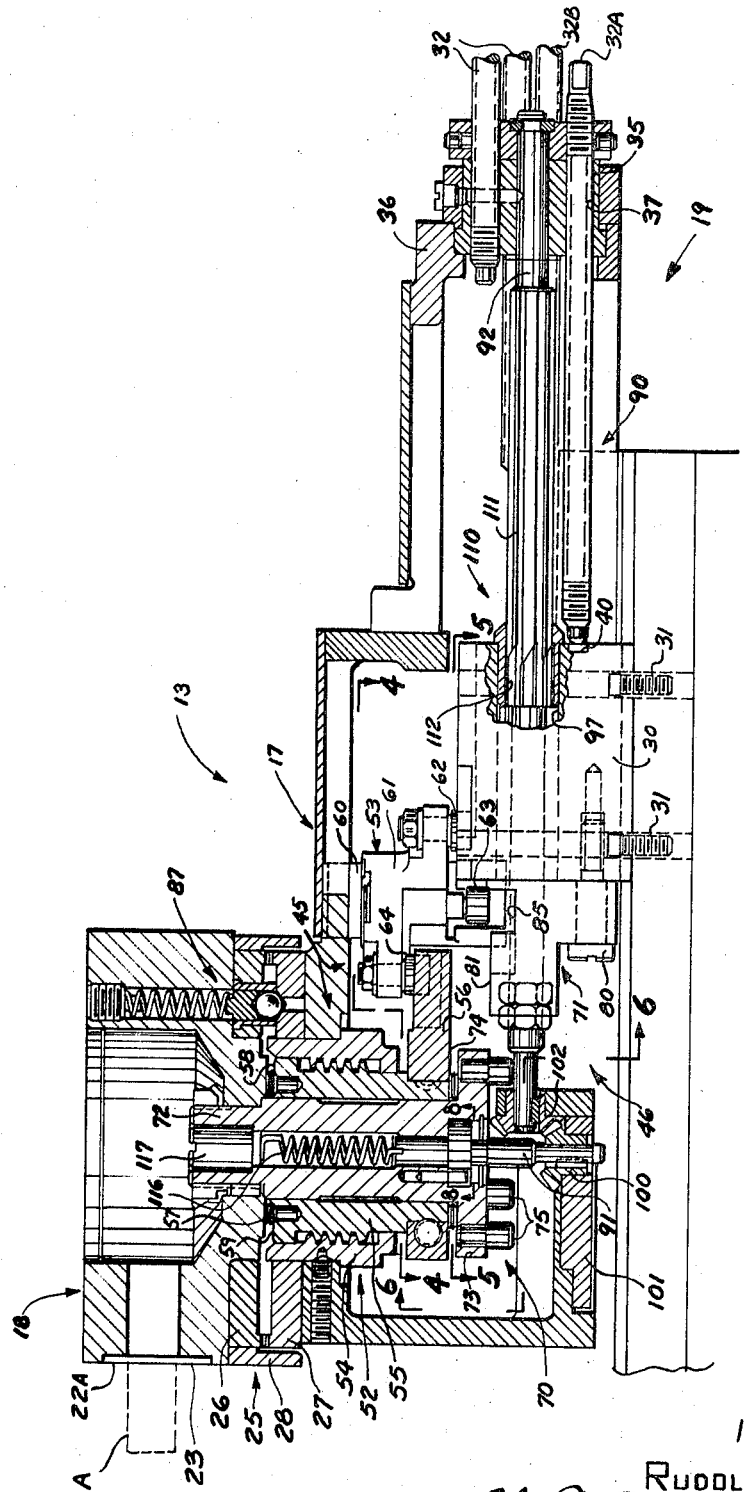
FIG. 3 is a sectional view taken approximately along the section lines 3—3 of FIG 2.

When the turret 18 is in its position shown in FIG. 2, the tool A is positioned angularly with respect thereto in its working position with the turret member 18 locked against rotation relative to the saddle 13 by a suitable coupling means 25 which is shown in FIG. 3. The coupling means 25 of the preferred embodiment is a curvic coupling comprising a toothed member 26 fixed to the frame 17 and a toothed member 27 fixed to a lower side of the turret 18. The teeth of the members 26, 27 are meshed when a tool supported on the turret is in a working position and is being fed toward the workpiece. A cover 28 surrounds the members 26, 27 and prevents lodging of foreign material between the teeth of the members 26, 27, which might otherwise prevent proper meshing of the teeth. The saddle 13 is moved toward the spindle from its retracted position by rotation of the hand wheel 16, or the feed drive motor, to effect engagement of the tool A with the work and perform a machining operation thereon during the feeding movement.

The stop means 19 is effective to limit the amount of feeding movement of the saddle 13 toward the spindle 14 and thereby limits the length of the surface produced on the workpiece by the tool A. The stop means 19 includes a feed stop member 30 which is fixed with respect to the support member 11 by suitable means, such as screws 31, and a plurality of feed stop screw members 32. In the illustrated turret lathe six feed stop screw members are provided, corresponding in number to the number of faces 22 on the turret member 18. The feed stop screw members 32 are supported by an annular support member 35 which is rotatably supported by a bearing portion 36 of the frame member 17. The support member 35 includes six threaded openings 37 extending axially therethrough, spaced equiangularly about the axis of rotation of the support member 35, and in which the feed stop screws 32 are threadedly engaged.

The feed stop member 30 includes five cylindrical openings or clearance holes 38 (see FIG. 6) extending therethrough which are located in alignment with five of the feed stop screws 32 when the feed stop screws are in their positions illustrated in FIG. 3. The sixth feed stop screw 32A, which may be said to correspond with the tool A, is aligned with an abutment surface 40 on the feed stop 30. As the saddle 13 is fed toward the spindle member 14, the tool A is moved toward the workpiece and the feed stop screws move with the saddle toward the feed stop 30. Any of the feed stop screws which are adjusted to extend beyond the feed stop screw 32A toward the feed stop 30 are in registry with the clearance holes 38 and extend into the holes as the feed stop screw 32A approaches the surface 40. The feed stop screw 32A engages the surface 40 and stops feeding of the tool A toward the spindle when the tool A has made a cut along a predetermined length of the workpiece.

Figure 4:
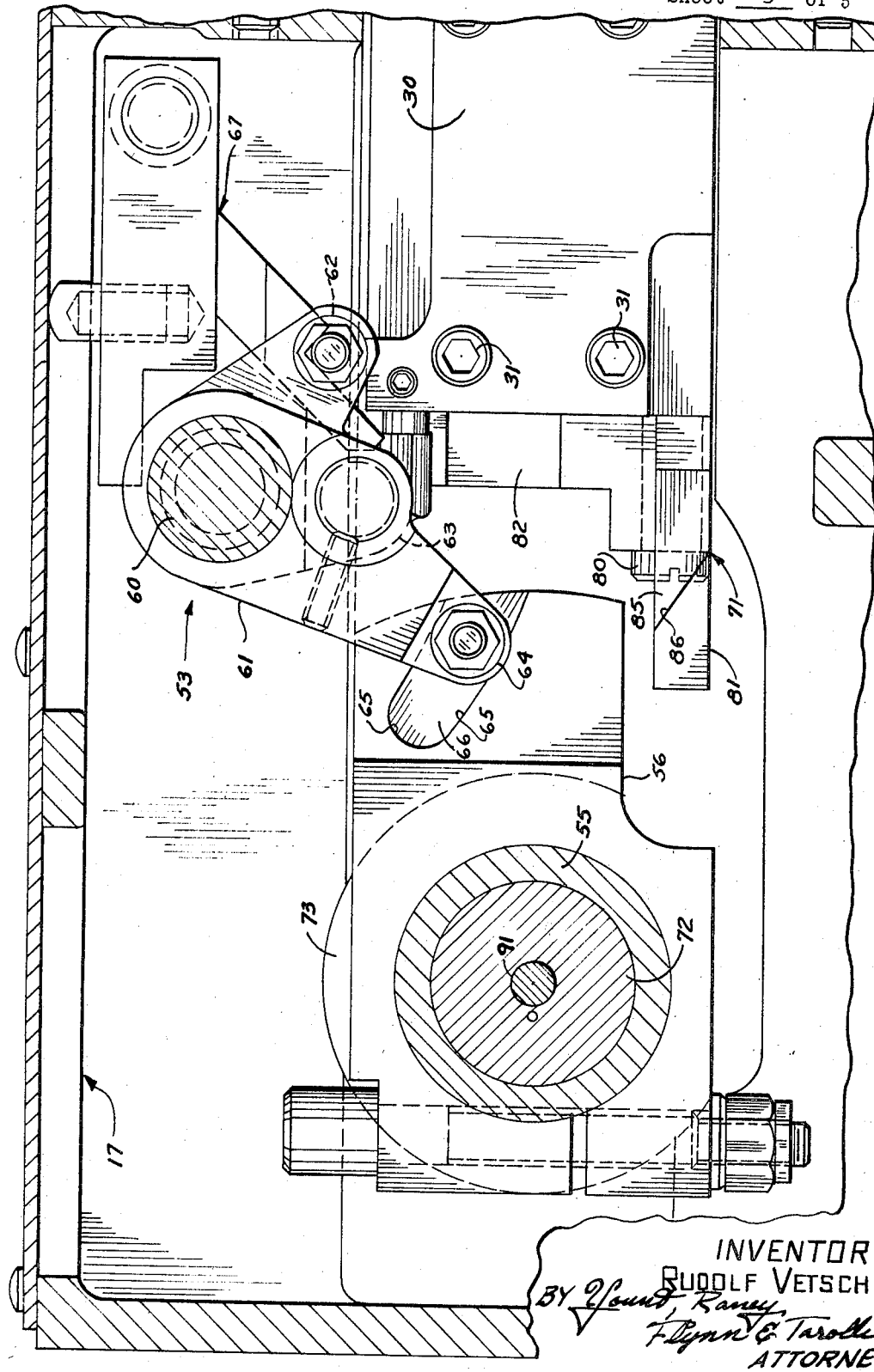
FIG. 4 is a sectional view taken approximately along the line 4—4 of FIG. 3.
Figure 5:
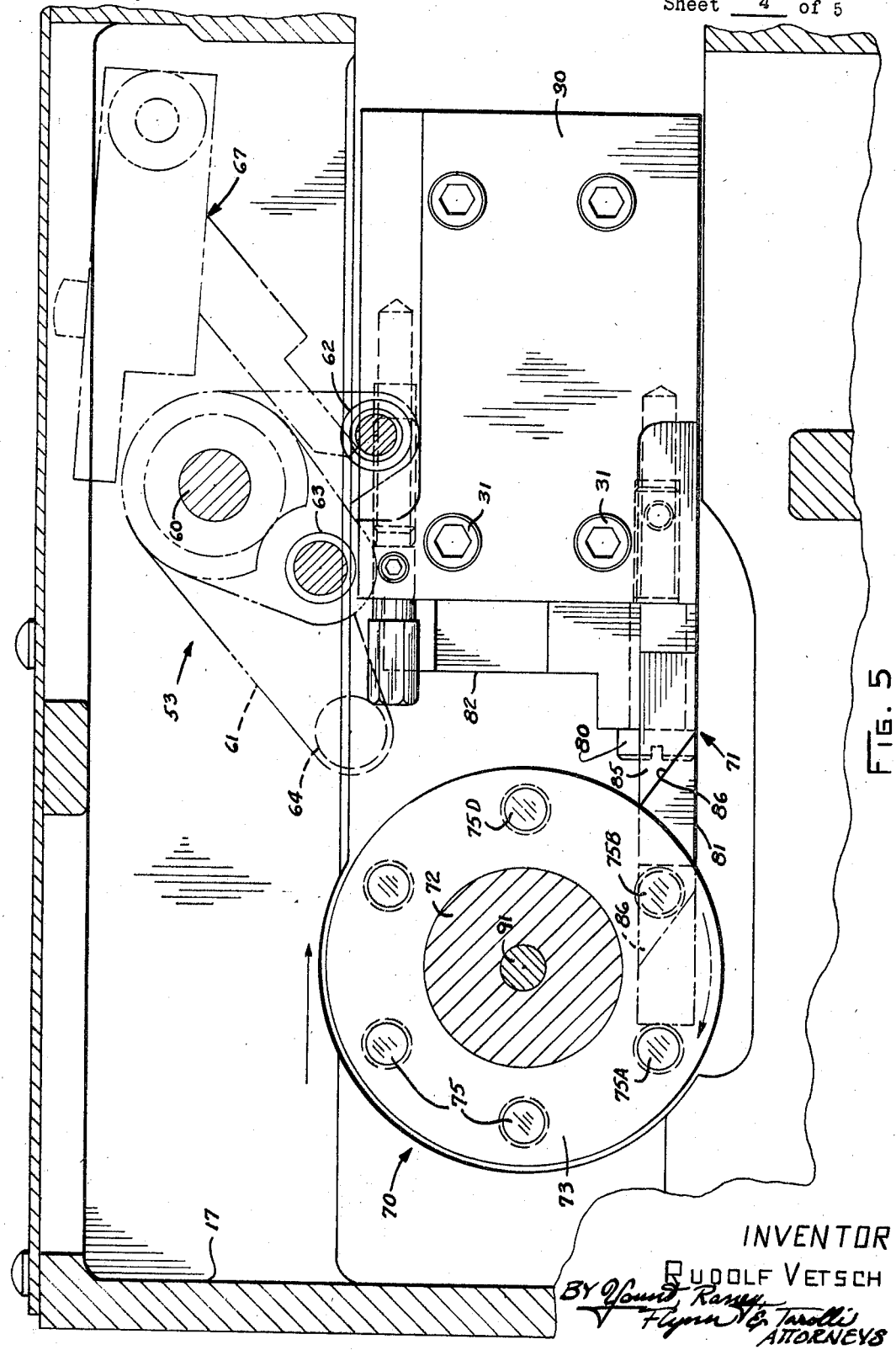
FIG. 5 is a sectional view taken approximately at the line 5—5 of FIG 3.

When feeding of the tool A is terminated, as described, the saddle 13 is retracted from the spindle along the bed 11 by reverse operation of the feeding mechanism and the tool B is moved to its working position so that another machining operation may be performed on the work. Means are provided for effecting indexing of the turret 18 to move the tool B into its working position. As best seen in FIGS. 3, 4 and 5, the means for moving the tool B as described includes a mechanism 45 for locking and unlocking the turret member 18 and indexing means 46 for rotating the turret member 18 to effect indexing of the tools thereon.

The locking mechanism 45 is effective to raise the turret member 18 relative to the frame 17 and thereby move the teeth of the members 26, 27 out of mesh to free the turret member 18 for rotational movement about its axis of rotation. The illustrated locking mechanism includes a screw jack mechanism 52 associated with the turret 18 and a rocker mechanism 53 connected to the frame 17. The screw jack mechanism includes an internally threaded member 54 fixed to the frame 17, an externally threaded tubular shaft 55 threadedly supported in the member 54, and a collar 56 fixed by suitable fastening means to the shaft 55. Rotation of the shaft 55 and collar 56 relative to the member 54 in a counterclockwise direction, as viewed in FIG. 4, moves the shaft 55 axially upwardly to raise the turret member 18 and disengage the coupling 25.

Needle bearings 57, illustrated in FIG. 3, are provided between an end surface 58 of the shaft 55 and an adjacent surface 59 on the lower side of the turret 18 to permit rotation of the shaft 55 relative to the turret while the turret is supported by the shaft. It should be apparent from the foregoing that the turret 18 is lowered by clockwise rotation of the shaft 55.

Referring now to FIGS. 4 and 5, the shaft 55 is rotated by the rocker mechanism 53 which engages the collar 56 and moves to effect rotation of the collar and the shaft 55. The rocker mechanism 53 includes a shaft 60 connected to the frame 17 and a link 61 carried by the shaft 60. The link 61 includes followers 62, 63, 64, preferably rollers, connected thereto. The followers 62 and 63 are engageable with the feed stop 30 when the saddle 13 is retracted a predetermined distance from the spindle 14, and the follower 64 engaged with camming surfaces 65 forming sides of a groove 66 in the collar 56. The link 61 is maintained substantially in its position shown in FIG. 4 by biasing means 67 during feeding of the saddle 13 toward the spindle, but when the saddle 13 is retracted a predetermined distance from the spindle, the followers 62, 63 successively engage surfaces of the feed stop 30 and rotate the link 61 against the action of the biasing means 67 to move the follower 64 from its position shown in FIG. 4 to its position shown in FIG. 5. Movement of the follower 64 rotates the collar 56 in a counterclockwise direction to arise the turret 18 and disengage the teeth of the coupling 25.

With the turret 18 in an unlocked position, the indexing means 46 is effective to rotate the turret in response to further retracting movement of the saddle 13 from the spindle 14. The indexing means includes a turret driving means 70 connected to the turret member 18 and an actuating member 71 connected to the feed stop 30 and which are cooperable to effect rotation of the turret 18 a predetermined amount as the turret member 18 approaches its fully retracted position. The driving means 70 includes a tubular shaft member 72 which is supported for rotation within the shaft 55 and which is secured to the turret 18 by a suitable connection, such as a key and keyway, to prevent relative rotation therebetween. The lower end of the shaft 72 includes a flange portion 73 which extends radially therefrom. Needle bearings 74 are provided between the flange portion 73 and the tubular shaft 55 to provide for relative rotation between the flange 73 and the shaft 55. The flange portion 73 additionally includes six pin members 75 which are fixed thereto at annularly spaced locations thereabout and which extend downwardly therefrom. The pins 75 are individually engageable by the actuating member 71 and moved by the member 71 to effect the indexing movement of the turret 18.

Figure 6:
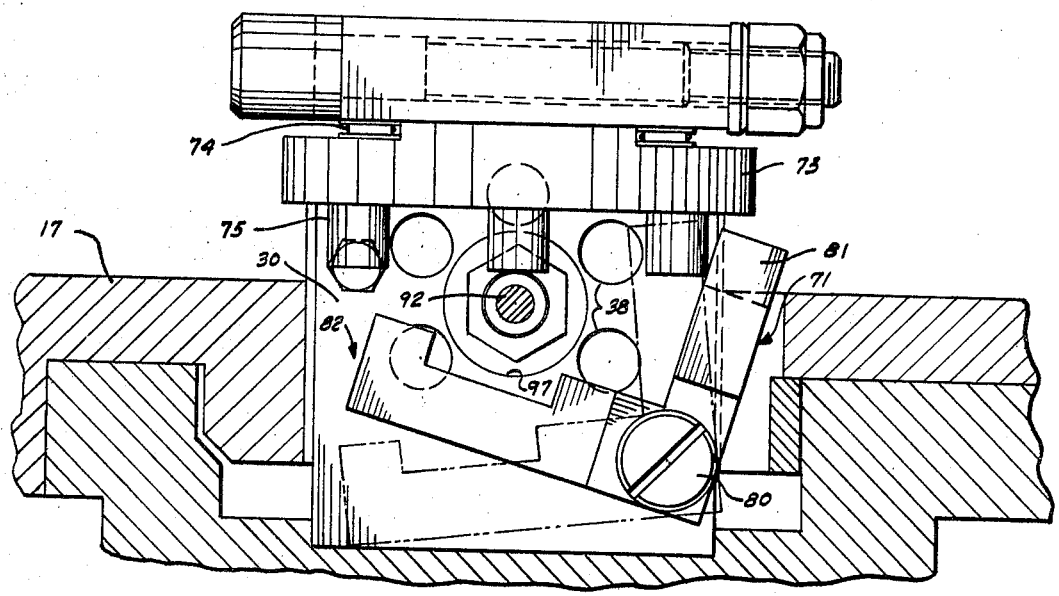
FIG. 6 is a sectional view taken approximately at line 6—6 of FIG. 3.

The actuating member 71 is secured to the feed stop 30 by means of a screw 80 which permits rotation of the member 71 thereabout relative to the feed stop, and includes a forwardly extending arm portion 81 and an arm 82 which extends radially from the axis of the screw 80 to weight bias the member 71 to its position shown in dotted lines in FIG. 6. With the actuating member 71 in its last mentioned position, the arm 81 is aligned with a pin 75B on the flange portion 73 of the shaft 72.

As the saddle 13 continues to move away from the spindle 14, the arm 81 engages the pin 75B on the flange portion 73 and effects rotation of the shaft 72 to index the unlocked turret 18. When the saddle 13 reaches its limit of travel toward its retracted position, the turret 18 is indexed 60 degrees by the engagement between the arm 82 and the pin 75B to move the tool B into its work engaging position. The arm 81 includes a slot 85 formed in an upper side thereof having a slanted side surface 86 thereon. As the turret member is rotated as described, a pin 75D moves with the flange portion 73 to the position previously occupied by the pin 75B and into engagement with the surface 86 of the slot 85 in the arm 81.

When the tool B has been indexed into its working position, the saddle is again fed toward the spindle 14 from its retracted position. As feeding of the saddle 13 is initiated, the pins 75B, 75D move relative to the arm 81 with the pin 75D cooperating with the surface 86 to rotate the actuating member 71 about the axis of the screw 80 to its position shown in solid lines in FIG. 6 and thereby move the member 71 out of the path of travel of the pin 75D. When the pin 75D moves out of engagement with the arm 81, the radially extending arm 82 is effective to rotate the actuating member 71 back to its initial position with the arm 81 aligned with the pin 75D so that subsequent indexing of the turret 18 can be effected. Detent means 87 are provided between the turret 18 and the frame 17 to maintain the tool B in its working position during the initial feeding of the saddle 13 so that frictional drag between the pin 75D and the arm 81 does not cause misalignment of the turret relative to the frame 17.

As the saddle 13 continues to be fed toward the spindle 14, the followers 62, 63 move out of engagement with the feed stop 30 and the biasing means 67 returns the rocker member to a position substantially as shown in FIG. 4 which effects rotation of the collar 56 and shaft 55 in a clockwise direction as viewed in FIG. 4 to lower the turret 18 and to move the teeth of the curvic coupling 25 into mesh. The detent means 87 guides the teeth of the curvic coupling into meshing engagement as the turret 18 is lowered so that the tool B is in its proper working position.

When the turret 18 is indexed to move the tool B into its working position, the extent of feeding movement of the saddle 13 in the direction of the spindle 14 is changed to correspond with the length of cut desired to be made by the tool B. As shown in the drawings, actuating means 90 drivingly connects the turret 18 to the annular support member 35, which carries the feed stop screws 32. The actuating means 90 rotates the block 35 upon indexing movement of the turret to index a feed stop screw 32B into alignment with the abutment surface 40 on the feed stop 30 as the tool B is moved into its work engaging position. The actuating means 90 includes a shaft 91 supported within the tubular shaft 72 for rotation therewith when the turret 18 is indexed, and which is geared to a shaft 92 drivingly connected to the support 35.

The shaft 91 includes a generally annular flange 93 positioned within the hollow shaft 72 and which is provided with a slot 94. The slot 94 includes a generally radially extending surface 95 which is adapted to engage a pin 96 fixed to the shaft 72 such that the shaft 91 is rotated with the turret 18 as the turret is indexed. A beveled pinion gear 100 is rotatably supported in a bearing member 101 of the frame 17 and is connected to the lower end of the shaft 91 for rotation therewith. The teeth of the gear 100 are meshingly engaged with the teeth of a bevel gear 102 rotatably supported in the bearing member 101 and fixed to the shaft 92.

The shaft 92 extends through an opening 97 in the feed stop 30 and is fixedly secured to the member 35 at its opposite end by suitable fasteners to prevent relative movement therebetween. As the turret is indexed from its position shown in FIG. 3 to move the tool B to its working position, the shaft 91 is rotated and drives the shaft 92 to effect rotation of the member 35. The member 35 is rotated through 60 degrees to align the feed stop screw 32B with the surface 40 and thereby align the remaining five feed stop screws 32 with the clearance holes 38 in the feed stop 30. Thus, when the saddle 13 is fed toward the spindle 14, the tool B engages the work and is fed along the work until its associated feed stop screw 32B engages the stop surface 40 on the feed stop 30.

In accordance with the present invention, an auxiliary tool on the corner of the turret 18, or at a position intermediate the normal tool support portions of the turret, is indexible into working position. To obtain the desired feeding of an auxiliary tool on the turret 18, the turret lathe 10 is provided with an actuating means 110 for aligning a particular one of the feed stop screws 32 with the abutment surface 40 of the feed stop 30 when an auxiliary tool is in its working position. When it is desired to index the turret from its position shown in FIG. 2 to a position wherein the tool C is in its working position, the turret 18 is retracted to unlock the turret as described previously. The turret 18 is then indexed 30 degrees manually by the operator of the machine to move the tool C into its working position.

Figure 7:
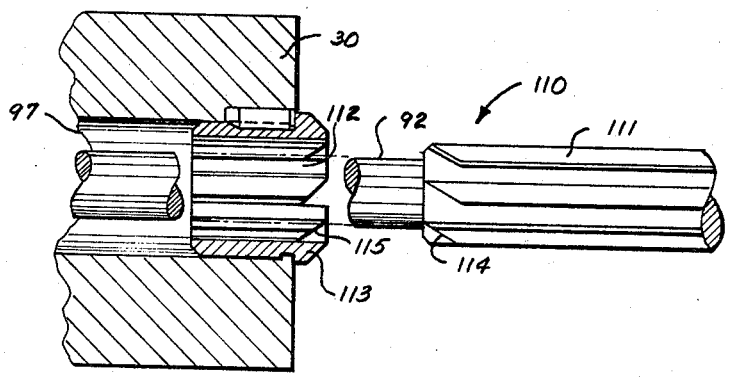
FIG. 7 is a fragmentary sectional view of a portion of the machine tool of FIG. 3 with parts thereof shown on a larger scale and in a different operative condition.
Figure 8:
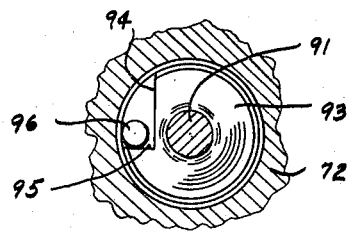
FIG. 8 is a sectional view taken approximately at line 8—8 of FIG. 3.

From the foregoing description, it should be appreciated that when the tool C is indexed to its working position, the feed stop screws 32 are moved by the actuating means 90 into positions wherein none of the feed stop screws 32 are aligned with the clearance holes 38 in the feed stop 30, or the abutment surface 40 thereon. The actuating means 110 is utilized to enable the stop means 19 to realign the feed stop screws 32 with the clearance holes 38 and abutment surface 40 so that feeding movement of the auxiliary tool C is limited only by a predetermined one of the feed stop screws. The actuating means 110 includes an externally splined portion 111 on the shaft 92 and an internally splined opening 112 in the feed stop 30 through which the shaft 92 extends. Each of the splines 111, 112 includes a plurality of teeth spaced equiangularly thereabout equal in number to the number of faces on the turret. In the illustrated embodiment of the invention, the internal splines 112 are formed in a sleeve-like member 113 fixed in the opening 97 in the feed stop 30. As best seen in FIG. 7, the opening 97 in the feed stop is of larger diametrical extent than the splines 111 on the shaft 92 so that the splined portion of the shaft 92 moves freely therethrough as the saddle 13 is fed toward the spindle member.

When the auxiliary tool C has been indexed to its working position, the feed stop screws 32 are 30 degrees out of alignment with the clearance holes 38 and the abutment surface 40 as the turret 18 begins its feeding movement. The means 110 actuates the stop means to realign the stop screws 32 with the clearance holes 38 and the abutment surface 40 in response to feeding of the turret 18 toward the spindle 14. As illustrated in FIG. 7, the splines 111, 112 include beveled pilot surfaces 114, 115 thereon respectively. When the feed stop screws 32 are out of alignment as noted, and the auxiliary tool C is fed toward the spindle 14, the surfaces 114, 115 of the splines 111, 112 move into camming engagement and rotate the shaft 92 through 30 degrees in a counterclockwise direction as viewed in FIG. 6. The additional 30 degree rotation of the shaft 92 effects alignment of the feed-stop screw 32B with the abutment surface 40 and aligns the remainder of the feed-stop screws 32 with the clearance holes 38 in the feed-stop. Thus, when the tool C is in its working position only the feed-stop screw 32B is effective to limit the feed of the saddle 13 and the turret. It should be apparent from the foregoing, that the splines are engaged and rotate the shaft 92 before any of the feed-stop screws are moved into engagement with the feed stop 30.

Rotation of the shaft 92 by engagement of the pilot surfaces 114, 115 of the splines 111, 112 causes counterclockwise rotation of the shaft 91 relative to the tubular shaft 72 through the gears 100, 102. When the shaft 91 is rotated relative to the shaft 72 as described, the flange portion 93 is rotated therewith 30 degrees to change the position of the slot 94 by 30 degrees relative to the pin 96. Due to the configuration of the slot 94, no drive is transmitted between surfaces thereof and the pin 96 so that no torque is transmitted by the shaft 72 to the turret member 18 which might otherwise damage parts of the lathe 10.

The actuating means 110 includes means for returning the feed-stop screws 32 to their positions 30 degrees out of alignment with the clearance holes 38 and the abutment surface 40 when the tool C is retracted from the work so that normal indexing of the turret 18 may be subsequently accomplished. In the illustrated embodiment of the invention, the upper end of the shaft 91 is nonrotatably connected to a torsion spring 116, positioned within the hollow shaft 72. The spring 116 extends between the shaft 91 and a plug 117 which is non-rotatably fixed in the opening of the shaft 72 at its upper end as viewed in the drawings. The plug 117 is non-rotatably connected to the torsion spring 116 so that when the shaft 91 is rotated 30 degrees by engagement of the splines 111, 112, as described, the spring 116 is loaded or twisted as a result of relative rotation between the shaft 91 and the plug 117.

After the tool C has been fed into the work, the saddle 13 is retracted from the spindle and the splines 111, 112 are moved out of meshing engagement. As the splines 111, 112 move out of mesh, the torsion spring 116 rotates the shaft 91 to its position wherein the pin 96 engages the surface 95 of the slot 94. Additionally, the spring 116 effects rotation of the shaft 92 back to its position wherein the feed-stop screws 32 are again 30 degrees out of alignment with the clearance holes 38 and the abutment surface 40 of the feed-stop 30.

When the saddle 13 is fully retracted, the turret 18 is unlocked as previously described and the actuating means 46 rotates the turret an additional 30 degrees to move the tool B into its working position. Rotation of the turret 18 aligns the feed-stop screw 32B with the abutment surface 40 and the remainder of the feed stop screws 32 with the clearance holes 38 as noted previously so that the lathe 10 is operative to advance the tool B a predetermined distance toward the workpiece.

It can now be seen that an improved turret lathe has been provided which is effective to permit use of auxiliary tools located intermediate normal tool supporting positions on the turret thereof and in which the auxiliary tools may be positioned to engage the work and are fed a predetermined distance into the work quickly and efficiently with a minimum amount of operator time involved.

While a preferred embodiment of the present invention has been illustrated and described herein in considerable detail, the present invention is not to be considered to be limited to the precise construction shown. It is my intention to cover hereby, all adaptations, modifications and uses of the present invention which come within the scope of the appended claims.

Having described my invention, I claim:

1. A machine tool including a work supporting member and a tool supporting member, one of said members being an indexible turret member supported for feeding movement toward and away from said other member and including a plurality of support portions thereon sequentially indexible into a working position, said turret member being indexible from a first position wherein one support portion is in its working position to a second position wherein another support portion is in its working position, stop means including a plurality of stops each corresponding to one of said support portions and each effective to limit feeding of said turret when its corresponding support portion is in its working position, first means drivingly connecting said turret member and said stop means and operable upon indexing of said turret to render a stop effective to limit feeding movement of said turret member, and second means for rendering one of said stops effective to limit feeding movement of said turret member at an indexed turret position intermediate said first and second positions.

2. A machine tool as defined in claim 1, further including an indexible support carrying said plurality of stops, and wherein said first means includes a shaft drivingly connected to said turret and said indexible support and rotatable upon indexing of said turret to index said indexible support.

3. A machine tool as defined in claim 2 wherein said second means comprises means for rotating said shaft and said indexible support in one direction a predetermined amount upon feeding movement of the turret when in said intermediate position to render said one of said stops effective.

4. A machine tool as defined in claim 3 further including means for effecting rotation of said shaft and said indexible support in a second direction opposite said one direction said predetermined amount upon return movement of said turret after machining.

5. A machine tool comprising, a support member, an indexible turret member mounted on said support member for feeding movement relative thereto and for rotation with respect thereto about an axis, first and second spaced tool support portions on said turret member, an auxiliary tool support portion on said turret member between said first and second tool support portions, stop means operable to limit feeding movement of said turret member relative to said support member comprising first and second stops fixed to one of said members and an abutment surface on the other of said members, said first stop and said abutment surface being aligned and said second stop and said abutment surface being out of alignment when said first tool support portion is in a predetermined angular position relative to said turret axis, first actuating means drivingly connected between said turret member and said stop means and operable to move said first stop and said abutment surface out of alignment and to align said abutment surface and said second stop when said second tool support portion is indexed to said predetermined angular position relative to said axis, and second actuating means operable to effect alignment of one of said stops and said abutment surface when said turret member is disposed with said auxiliary tool support portion in said predetermined angular position relative to said axis.

6. A machine tool as defined in claim 5 wherein said first actuating means includes a first shaft member rotatably driven by said turret member upon indexing thereof in a first direction and a second shaft member drivingly connected to said first shaft member and operable to effect relative movement between said stops and said abutment surface when said turret member is indexed.

7. A machine tool as defined in claim 6 wherein said second actuating means includes parts associated with said second shaft member for effecting movement thereof to align said abutment surface and said one stop and with said one stop effective to limit feeding movement of said auxiliary tool.

8. A machine tool as defined in claim 7 wherein said parts include a surface fixed to said second shaft and a surface fixed relative to said support member and wherein said surfaces move into camming engagement during feeding movement of said turret member to rotate said second shaft and align said one stop and said abutment surface.

9. A machine tool as defined by claim 7 and further including biasing means connected between said first shaft member and said turret member and effective to urge said first shaft member in a direction opposite to said first direction relative to said turret member when said auxiliary tool is in said predetermined angular position and said one stop member is aligned with said abutment surface.

10. A machine tool as defined in claim 9 wherein said biasing means is effective to move said one stop and said abutment surface out of alignment during retracting movement of said turret member.

11. A machine tool including a work supporting member and a tool supporting member, one of said members being an indexible turret member supported for feeding movement toward and away from said other member and including a plurality of support portions thereon, stop means including a plurality of stops each corresponding to one of said support portions and each effective to limit feeding of its corresponding support portion toward said other member, first means drivingly connecting said turret member and said stop means and operable to render one of said stops effective to limit feeding movement of said turret member in response to indexing of said turret member, and second means for indexing said stop means in response to feeding movement of said turret member.

12. A machine tool as defined in claim 11 wherein said second means is ineffective to index said stop means when one of said support portions is in a predetermined indexed position on said turret member.

13. A machine tool as defined in claim 11 wherein said turret member further includes auxiliary support portions intermediate said support portions and wherein said second means is effective to index said stop means when one of said auxiliary support portions is in a predetermined indexed position on said turret member.

14. A machine tool as defined in claim 13 wherein said second means is ineffective to index said stop means when one of said support portions is in said predetermined position.

15. A machine tool as defined in claim 11 wherein said first means includes first and second shaft members drivingly connecting said turret member and said stops and effective to index said stops in a first direction upon indexing of said turret, and with said second means effective to rotate one of said shaft members and index said stops in said direction independently of indexing of said turret member.

16. A machine tool as defined in claim 15 and further including connecting means between one of said shaft members and said turret member including parts engageable to rotate said one shaft member in one direction upon indexing of said turret member and with said parts moving out of engagement upon rotation of said one shaft relative to said turret member in said direction.

17. A machine tool including a work supporting member and a tool supporting member, one of said members being an indexible turret member adapted to support normal work engaging tools at first and second locations thereon and an auxiliary tool intermediate said locations with said tools successively supported in working positions for feeding movement toward and away from the other member, feed-stop means controlling the length of feed of tools supported in the working position on said turret member and means for indexing said stop means when an auxiliary tool is in a working position on said turret member to provide a stop for the feed thereof toward the work supporting member.

18. A machine tool as defined in claim 17 wherein said means for indexing said stop means is operable in response to feeding movement of the said turret member.

19. A machine tool as defined in claim 17 wherein said means is ineffective to index said stop means when a normal work engaging tool is in its working position.

20. A machine tool as defined in claim 17 and further including indexing means drivingly connected between said turret member and said stop and means including shaft means rotatable to index said stop means in a first direction in response to indexing movement of said turret and with said means for indexing said stop means operable to rotate said shaft means in said first direction relative to said turret member.

21. A machine tool as defined in claim 20 wherein said means for indexing said stop means includes a plurality of spline teeth fixed to said shaft means and a plurality of stationary spline teeth, said spline teeth including camming surfaces engageable to rotate said shaft means in said first direction after a predetermined amount of feeding movement of said turret member toward said other member and before said stop means is operable to stop said feeding movement.

22. A machine tool as defined in claim 21 and further including spring means for rotating said shaft means in an opposite direction as said auxiliary tool is retracted from the work and said spline teeth are disengaged.

23. A machine tool as defined in claim 22 and further including driving means connected between said turret member and said shaft means including a pin and slot connection for rotating said shaft means in one direction in response to indexing of said turret with said pin movable relative to said slot upon rotation of said shaft means in said direction to permit rotation of said shaft means relative to said turret member.

References Cited

UNITED STATES PATENTS 3,043,278 7/1962 Ackerman _____ 82—21 XR
3,190,151 6/1965 Kozacka _____ 77—25 XR LEONIDAS VLACHOS, *Primary Examiner.*

U.S. Cl. X.R.

29—39; 77—25